US006935163B2

(12) United States Patent
Stewart et al.

(10) Patent No.: US 6,935,163 B2
(45) Date of Patent: Aug. 30, 2005

(54) METHOD FOR TESTING PARTS FOR LEAKS

(75) Inventors: Jack D. Stewart, Doylestown, PA (US); Joseph E. Hanusey, Jr., Doylestown, PA (US)

(73) Assignee: Stewart Ergonomics, Inc., Furlong, PA (US)

( * ) Notice: Subject to any disclaimer, the term of this patent is extended or adjusted under 35 U.S.C. 154(b) by 0 days.

(21) Appl. No.: 10/718,476

(22) Filed: Nov. 20, 2003

(65) Prior Publication Data

US 2005/0109082 A1 May 26, 2005

(51) Int. Cl.⁷ .............................................. G01N 3/04
(52) U.S. Cl. .................................................... 73/49.7
(58) Field of Search ............................... 73/40, 41, 45, 73/45.1, 45.2, 45.3, 49.2, 49.7; 702/51

(56) References Cited

U.S. PATENT DOCUMENTS

| | | |
|---|---|---|
| 4,089,208 A | 5/1978 | Franks et al. |
| 4,106,263 A | 8/1978 | Conrad |
| 4,126,034 A | 11/1978 | Conrad |
| 4,182,159 A | 1/1980 | Churchman |
| 4,197,733 A | 4/1980 | Holland et al. |
| 4,207,146 A | 6/1980 | Kunke |
| 4,291,573 A | 9/1981 | Richter et al. |
| 4,366,715 A | 1/1983 | Bradshaw |
| 4,378,692 A | 4/1983 | Walle |
| 4,413,501 A | 11/1983 | Schröck |
| 4,417,465 A | 11/1983 | Noe et al. |
| 4,494,402 A | 1/1985 | Carney |
| 4,555,935 A | 12/1985 | Elert |
| 4,581,919 A | 4/1986 | Sullivan |
| 4,587,619 A | 5/1986 | Converse, III et al. |
| 4,617,824 A | 10/1986 | Cybulski et al. |
| 4,675,070 A | 6/1987 | Pasternicki |
| 4,715,214 A | 12/1987 | Tveter et al. |
| D294,229 S | 2/1988 | Bonazzi |
| 4,791,805 A | 12/1988 | Gates |
| 4,942,758 A | 7/1990 | Cofield |
| 4,953,396 A | 9/1990 | Langsdorf et al. |
| 5,092,162 A | 3/1992 | Self |
| 5,187,974 A | 2/1993 | Mellits et al. |
| 5,201,212 A | 4/1993 | Williams Barry N. |
| 5,216,914 A | 6/1993 | Horner |
| 5,317,899 A | 6/1994 | Hutchinson et al. |
| 5,331,842 A | 7/1994 | Wellemeyer |

(Continued)

Primary Examiner—Charles Garber
(74) Attorney, Agent, or Firm—Sperry, Zoda & Kane (57) ABSTRACT

A method for gas pressurizing of parts for leakage detection including an enhanced process for reliably achieving full gas pressurization of the part to a predetermined test pressure value and monitoring for various errors which may occur during pressurization, and after pressure and temperature settling, taking an instantaneous snapshot pressure measurement and calculating two pressure thresholds. A snapshot pressure measurement is compared to a slam threshold value after termination of the slam time period and if pressure remains above the threshold signaling "good" and terminating the test. If the measured pressure reads below the slam threshold during slam test then the slam test terminates and the standard threshold test will then be performed repeatedly over the total test time which will yield a good result unless the pressure goes below the standard threshold during total test time which will then yield a bad part result.

36 Claims, 5 Drawing Sheets

U.S. PATENT DOCUMENTS

| | | |
|---|---|---|
| 5,375,455 A | 12/1994 | Maresca, Jr. et al. |
| 5,377,530 A | 1/1995 | Allen et al. |
| 5,412,978 A | 5/1995 | Boone et al. |
| 5,415,033 A | 5/1995 | Maresca, Jr. et al. |
| 5,495,749 A * | 3/1996 | Dawson et al. .............. 73/49.7 |
| 5,528,926 A | 6/1996 | Emmitte, Jr. |
| 5,546,789 A | 8/1996 | Balke et al. |
| 5,563,336 A | 10/1996 | Mallet |
| 5,574,213 A | 11/1996 | Shanley |
| 5,616,854 A | 4/1997 | Berg |
| 5,760,296 A | 6/1998 | Wilson |
| 5,847,264 A | 12/1998 | Martin et al. |
| 5,880,358 A | 3/1999 | Emmitte, Jr. |
| 5,883,302 A | 3/1999 | Kent |
| 5,920,009 A | 7/1999 | Enders et al. |
| 6,116,340 A | 9/2000 | Wilson et al. |
| 6,164,139 A | 12/2000 | Krimmer |
| 6,199,432 B1 | 3/2001 | Dunn |
| 6,209,560 B1 | 4/2001 | Shaw |
| 6,223,766 B1 | 5/2001 | Shaw et al. |
| 6,279,383 B1 | 8/2001 | Balke et al. |
| 6,318,155 B1 | 11/2001 | Carr |
| 6,348,869 B1 | 2/2002 | Ashworth |
| 6,530,264 B1 | 3/2003 | Rink et al. |
| 6,549,857 B2 | 4/2003 | Fierro et al. |

* cited by examiner

| Test parameters | | Approximate Estimated Values |
|---|---|---|
| 1 | test pressure value | 90 psi |
| 2 | standard pressure differential value | .035 psi |
| 3 | total test time | 15 seconds |
| 4 | snapshot time delay | 4 seconds |
| 5 | maximum fill time (low air time) | 2.8 seconds |
| 6 | minimum fill time | 0.4 seconds |
| 7 | slam test time | 1.1 seconds |
| 8 | slam pressure differential value | .001 psi |
| 11 | next test program | 0 or 2 |

Figure 5

METHOD FOR TESTING PARTS FOR LEAKS

BACKGROUND OF THE INVENTION

1. Field of the Invention

The present invention deals with the field of devices wherein various different kinds of parts are tested for unwanted leakage. Parts that are tested in this manner are used in all areas of industry but examples of such items which require testing for leaks include gas masks, automotive brake lines, automotive fuel lines, gas tanks, gas tank filler lines, air conditioning lines and other connecting lines or conduits usually, but not always, made of metallic or elastomeric materials.

Normally a part to be tested such as a fuel line is sealed by plugging each opposite end while allowing a fill line and a pressure sensing member to be positioned within one of the plug components such as to be in fluid flow communication with the sealed chamber defined within the line or conduit. Normally the test part is then filled with a precise amount of gas such as air under pressure up to a predetermined test pressure value. This test pressure value is usually greater than atmospheric pressure but the present invention is certainly usable to test for leakage at less than atmospheric pressure, more commonly referred to as vacuum leak testing. Then, after a short period of pressure and temperature stabilizing time, the pressure monitored by the sensing means is compared with a predetermined threshold level and in this manner any leaks can be detected.

Such apparatus is normally heavily dependent upon the pre-set value of a coarse pressure valve or pressure control device and, thus, a fairly large loss of pressure from the approximate value to which the coarse device is set is required in order to determine if a an excessive amount of leakage has occurred. The present invention provides a unique method which includes a snapshot instantaneous pressure measurement performed immediately after temperature and pressure stabilization of the initial pressurization of a part which can be utilized in coordination with a calculation process to determine whether a part is good or bad after only very small pressure losses over relatively small time periods. Also the present invention provides a unique method for assuring proper full pressurization with a coordinated error detecting and displaying process.

This method disclosed herein is useful for pressure testing for leakage at pressures greater than standard atmospheric pressure and, also, is usable for vacuum testing for leakage at pressures less than standard atmospheric pressure. Normally one standard atmospheric pressure is approximately 14.7 pounds per square inch. This value will vary at different locations depending upon many different factors such as elevation and temperature. It is important to appreciate that all pressure values herein are presented in absolute value terms. As such, a pressure of approximately 29.4 psi should be interpreted to mean pressurizing to about double the standard atmospheric pressure. On the other hand pressures listed below about 14.7 psi such as 5 or 10 psi should be considered as an environment subject to at least a partial vacuum. Thusly, any reference to a pressurization of zero psi is a reference to a theoretical perfect vacuum.

2. Description of the Prior Art

Various patents have been granted for leak testing or testing of parts for leaks such as U.S. Pat. No. 4,089,208 patented May 16, 1978 to N. J. Franks et al and assigned to Owens-Illinois, Inc. on a "Pressure Test Fixture For Pressurized Containers"; and U.S. Pat. No. 4,106,263 patented Aug. 15, 1978 to W. A. Conrad and assigned to Rheem Manufacturing Company on an "Apparatus For Pressure Testing Of Containers"; and U.S. Pat. No. 4,126,034 patented Nov. 21, 1978 to W. A. Conrad and assigned to Rheem Manufacturing Company on a "Method And Apparatus For Container Pressure Testing"; and U.S. Pat. No. 4,182,159 patented Jan. 8, 1980 to R. K. Churchman and assigned to Otis Engineering Corporation on a "Pressure Testing Tool"; and U.S. Pat. No. 4,197,733 patented Apr. 15, 1980 to R. W. Holland on a "Pressure Test Apparatus"; and U.S. Pat. No. 4,207,146 patented Jun. 10, 1980 to S. Kunke and assigned to Dragerwerk Aktiengesellschaft on a "Process For Testing Gases In Body Fluids For Partial Pressure And To A Testing Device Therefor"; and U.S. Pat. No. 4,291,573 patented Sep. 29, 1981 to S. J. Richter et al and assigned to The Coca-Cola Company on a "Reject System For In-Line Pressure Testing Systems"; and U.S. Pat. No. 4,366,715 patented Jan. 4, 1983 to J. H. Bradshaw and assigned to The Gillette Company on a "Pressure Testing Apparatus"; and U.S. Pat. No. 4,378,692 patented Apr. 5, 1983 to L. I. Walle and assigned to Air Monitor Co., Inc. on a "Leak Detecting Monitor"; and U.S. Pat. No. 4,413,501 patented Nov. 8, 1983 to P. Schrock on an "Apparatus For Pressure Testing Tubing"; and U.S. Pat. No. 4,417,465 patented Nov. 29, 1983 to R. R. Noe et al on a "Portable Test Unit, For High Pressure Testing Of Tubes"; and U.S. Pat. No. 4,494,402 patented Jan. 22, 1985 to P. T. Carney on a "Device And Method For Pressure Testing"; and U.S. Pat. No. 4,555,935 patented Dec. 3, 1985 to K. Elert and assigned to The Stroh Brewery Company on an "Apparatus For Pressure Testing of Can Bodies And Lids"; and U.S. Pat. No. 4,581,919 patented Apr. 15, 1986 to M. M. Sullivan on a "Retrievable Hydrostatic Testing Tool For Pressure Testing Tubing"; and U.S. Pat. No. 4,587,619 patented May 6, 1986 to V. G. Converse, III et al and assigned to Scans Associates, Inc. on a "Method And Apparatus For Electronic Leak Testing"; and U.S. Pat. No. 4,617,824 patented Oct. 21, 1986 to L. P. Cybulski et al and assigned to R. R. McGlogan Equipment Ltd. on a "Cylinder Head Pressure Testing Apparatus"; and U.S. Pat. No. 4,675,070 patented Jun. 23, 1987 to M. Pasternicki and assigned to Sidel on a "Machine For Pressure Testing And Bottom Capping Plastic Bottles"; and U.S. Pat. No. 4,715,214 patented Dec. 29, 1987 to R. S. Tveter et al and assigned to S. Himmelstein and Company on a "Leak Tester"; and U.S. Design Pat. No. Des.294,229 patented Feb. 16, 1988 to P. Bonazzi on a "Machine For Pressure Testing Truck Tires"; and U.S. Pat. No. 4,791,805 patented Dec. 20, 1988 to D. C. Gates and assigned to Expertek, Inc. on a "Fuel Tank Leak Detection Apparatus"; and U.S. Pat. No. 4,942,758 patented Jul. 24, 1990 to D. H. Cofield on a "High Speed Leak Tester"; and U.S. Pat. No. 4,953,396 patented Sep. 4, 1990 to J. W. Langsdorf et al and assigned to General Mills, Inc. on a "Leak Detector For Containers"; and U.S. Pat. No. 5,092,162 patented Mar. 3, 1992 to F. Self on a "Static Pressure Testing Apparatus"; and U.S. Pat. No. 5,187,974 patented Feb. 23, 1993 to K. E. Mellits et al and assigned to Snap-On Tools Corporation on a "Vehicular Pressure-Testing Apparatus"; and U.S. Pat. No. 5,201,212 patented Apr. 13, 1993 to B. N. Williams and assigned to Tanknology Corporation International on a "Line Leak Detector And Method"; and U.S. Pat. No. 5,216,914 patented Jun. 8, 1993 to J. R. Horner and assigned to Horner Creative Products, Inc. on "Methods And Systems For The Negative Pressure Testing Of Underground Storage Tanks Containing Highly Vaporous Hydrocarbon Liquids"; and U.S. Pat. No. 5,317,899 patented Jun. 7, 1994 to R. J. Hutchinson et al and assigned to Control Engineers, Inc. on a "Method For Detecting Leaks In Underground Product Lines"; and U.S. Pat. No. 5,331,842 patented Jul. 26, 1994 to R. G. Wellemeyer and assigned to Smith Fiberglass Products Inc. on a "Cyclical Pressure Testing Apparatus"; and U.S. Pat. No. 5,375,455 patented Dec. 27, 1994 to J. W. Maresca, Jr. et al and assigned to Vista Research, Inc. on "Methods For Measuring Flow Rates To Detect Leaks"; and U.S. Pat. No. 5,377,530 patented Jan. 3, 1995 to B. F. Allen et al and assigned to Combustion Engineering, Inc. on "Apparatus For Hydrostatic Pressure Testing Of Tubular Products"; and U.S. Pat. No. 5,412,978 patented May 9, 1995 to G. R. Boone and assigned to Phase 1 Instruments, Inc. on a "Leak Detection System"; and U.S. Pat. No. 5,415,033 patented May 16, 1995 to J. W. Naresca, Jr. et al and assigned to Vista Research, Inc. on a "Simplified Apparatus For Detection Of Leaks In Pressurized Pipelines"; and U.S. Pat. No. 5,528,926 patented Jun. 25, 1996 to J. P. Emmitte, Jr. on a "Method For Pressure Testing Valves"; and U.S. Pat. No. 5,546,789 patented Aug. 20, 1996 to D. J. Balke et al and assigned to InterTech Development Company on a "Leakage Detection System"; and U.S. Pat. No. 5,563,336 patented Oct. 8, 1996 to R. J. Mallet on an "Apparatus For Pressure Testing Of Tubulars"; and U.S. Pat. No. 5,574,213 patented to A. W. Shanley on Nov. 12, 1996 on an "Apparatus And Method For Detecting Leaks"; and U.S. Pat. No. 5,616,854 patented Apr. 1, 1997 to P. Berg on an "Apparatus For Pneumatically Testing Pipes For Leaks"; and U.S. Pat. No. 5,760,296 patented Jun. 2, 1998 to M. S. Wilson and assigned to ABW Australia Pty. Ltd. on a "Cooling System Pressure Testing For Leak Detection"; and U.S. Pat. No. 5,847,264 patented Dec. 8, 1998 to C. R. Martin et al and assigned to Roper Holdings, Inc. on a "Leak Tester With Flexible Equation Capabilities"; and U.S. Pat. No. 5,880,358 patented Mar. 9, 1999 to J. P. Emmitte, Jr. on a "Method And Apparatus For Pressure Testing Valves"; and U.S. Pat. No. 5,883,302 patented Mar. 16, 1999 to L. R. Kent and assigned to Kent & Swart Investments CC on "Pressure Testing Of Engine Components Having Coolant Flow Paths"; and U.S. Pat. No. 5,920,009 patented Jul. 6, 1999 to T. Enders et al and assigned to Robert Bosch GmbH on a "Method For Generating A Certain Constant Pressure In A Test Liquid Of A Test Apparatus"; and U.S. Pat. No. 6,116,340 patented Sep. 12, 2000 to S. J. Wilson et al and assigned to Atlantic Richfield Company on a "Downhole Build-Up Pressure Test Using Coiled Tubing"; and U.S. Pat. No. 6,164,139 patented Dec. 26, 2000 to P. P. Krimmer on a "Pressure Test Gauge Assembly"; and U.S. Pat. No. 6,199,432 patented Mar. 13, 2001 to D. Dunn and assigned to BG PLC on "Fluid Pressure Testing"; and U.S. Pat. No. 6,209,560 patented Apr. 3, 2001 to J. B. Shaw and assigned to Presto-Tap, LLC on a "Pressure Testing Assembly And Testing Method For Propane Tank Systems"; and U.S. Pat. No. 6,223,766 patented May 1, 2001 to J. B. Shaw et al and assigned to Presto-Tap, LLC on a "Pressure Testing Apparatus And Testing Method For Propane Tank Systems" and U.S. Pat. No. 6,279,383 patented Aug. 28, 2001 to D. J. Balke et al and assigned to Intertech Corporation on a "Method And Apparatus For Detecting Leakage"; and U.S. Pat. No. 6,318,155 patented Nov. 20, 2001 to B. Carr on a "Pressure Testing Apparatus"; and U.S. Pat. No. 6,348,869 patented Feb. 19, 2002 to R. P. Ashworth and assigned to Lattice Intellectual Property Limited on a "Pipe Leak Detection"; and U.S. Pat. No. 6,530,264 patented Mar. 11, 2003 to K. K. Rink et al and assigned to Autoliv ASP, Inc. on "Detection Systems And Methods"; and U.S. Pat. No. 6,549,857 patented Apr. 15, 2003 to M. R. Fierro et al and assigned to Vista Research, Inc. on "Methods For Detecting Leaks In Pressurized Piping With A Pressure Measurement System".

SUMMARY OF THE INVENTION

The present invention provides a dry leak testing method which allows a test part such as a gas line, fuel line, refrigeration line or gas mask or other elastomeric or metal parts to be filled with as fluid such as a gas which may be air under pressure in such a manner that a full effective "fill" is achieved. This pressurization can be performed to any level which can be above or below standard atmospheric pressure. Initially a plurality of test parameters are set. These test parameters comprise various time periods and pressure levels which are used in accordance with the method of the present invention. The time periods include the total test time of approximately 15 seconds and the snapshot time delay of approximately 4 seconds as well as a slam test time of approximately 1.1 seconds. The values which are set at particular pressure levels include the test pressure value which may be approximately 90 psi and the standard pressure differential which is approximately 0.035 psi and the slam pressure differential which is 0.001 psi. Maximum and minimum fill times can also be provided. The maximum fill time or low air time is commonly in the range of approximately 2.8 seconds and the minimum fill time is normally in the range of 0.4 seconds. All of the above pressure and time parameters can vary substantially from these values, however, the above values are approximate values estimated to be commonly used in accordance with the method of the present invention.

Initially the test parameters are pre-set and the part is sealed. This sealing can occur in various ways and with various plugging fixtures depending upon the configuration of the part being tested. However, the means of sealing must also include a pressure fill line in fluid flow communication with the pressurized chamber within the part. The sealing means will also include a pressure sensing means in fluid flow communication with the pressurized environment within the chamber being tested for monitoring the pressure therewithin.

Once the part is sealed the pressurized gas such as air will be supplied through the pressure fill line to initiate pressurization of the test part. Such pressurization is normally achieved by activating of a fill valve at the output of the pressure supply means which can be of a variety of various configurations. The purpose of the fill line is to pressurize the part to the predetermined test pressure value which in common situations will be approximately 90 psi, but could be from a vacuum to 10,000 psi.

If a significant or gross leak is present in the part the measured pressure therewithin will never reach the test pressure value. The pressure will normally be sensed approximately every tenth of a second as continued pressurizing of the test part occurs. If the predetermined test pressure value is not reached within the pre-set maximum fill time then an error code will be generated that will usually indicate that a gross leakage condition has occurred and the part will depressurize and the testing will immediately terminate thereafter.

Another error that can occur during initial pressurization is if there is some type of blockage which prevents the entire expanse of the internal volume of the pressurized chamber from being pressurized. This often occurs, for example, in a brake or gas line if there is some type of blockage such as a internal weld, bend or other improper formation limiting or preventing movement of the pressurized gas or air into the entire area of the sealed chamber within the part. As pressurization of the test part occurs, the current pressure is always monitored to be sure that it does not reach the predetermined test pressure value prior to a predetermined minimum fill time. If the test pressure is reached prior to expiration of the minimum fill time another error message will be generated indicating that a blocked condition exists within the part and depressurization will occur followed by test termination.

The actual measured pressure during the pressurization within the test part is monitored at all times to determine whether the current pressure exceeds the test pressure value by a given value. Usually this value will be set to 25% but it can be chosen at other values, however this setting is normally established by the original equipment manufacturer or by a licensed service technician. This chosen value is the level at which it will be deemed that dangerously excessive pressurization has occurred. If this condition occurs then it means that there is some malfunction in the pressure regulation apparatus of the test equipment and a danger may exist. Indication of this type of error will cause the system to go into a failsafe mode terminating the test and indicating a specific error code. Each different error or problem causing termination of the testing sequence will generate a different error code which will then be displayed followed by immediate depressurization of the test part.

If a correct pressurization or "good fill" of the test part is achieved, the pressurizing of the test part will be terminated by deactivating the fill valve. Thereafter, it is important that a time delay, referred to in the present invention as the snapshot time delay, be counted down prior to making the snapshot pressure measurement. This time delay normally is approximately 4 seconds but could be chosen as needed for the specific application. This time delay period is commonly known as the settle time which allows all temperature and pressure gradients within the filled environment and the test equipment to equalize and stabilize. Once the snapshot time delay has expired an instantaneous current pressure measurement will occur which will yield a value referred to as the snapshot pressure value. Once this value is measured it will remain at this fixed value for the remainder of the current test despite the fact that the measured value at subsequent times may decrease slightly therefrom.

This snapshot pressure value is used to determine the low good standard threshold pressure measured in psi which is calculated by subtracting the predetermined standard pressure differential value from the snapshot pressure value. Also a low good slam threshold pressure is calculated in psi by subtracting the preset slam differential value from the snapshot pressure value. These two thresholds will be used to perform two separate pressure loss tests on the part subsequently in the process. In all cases the slam pressure differential value will be less than the standard pressure differential value and, as such, in all cases the calculated low good slam threshold pressure will be greater than the calculated low good standard threshold pressure.

Once these two pressure thresholds are calculated the process will continue with the monitoring of the current pressure within the internally sealed chamber of the part being tested over regular time intervals normally with one pressure measurement occurring every 0.1 seconds. These test measurements will be monitoring to determine the values of the internal pressure within the sealed part as it decays, if it decays. If the measured pressure does not read below the low good standard threshold pressure by the expiration of the total test time period, the part is deemed a good part. On the other hand, if the measured pressure does go below the low good standard threshold pressure during the total test time period or prior to expiration thereof, then a bad part will be indicated. Normally the total test time period will be approximately 15 seconds and the standard differential will be approximately 0.035 psi. Thus, as long as pressure decay during those 15 seconds is less than a total of 0.035 psi, then the part will be indicated good and, if the pressure decay is greater than that value then the part will be declared bad.

A much faster test for a good part is performed and is called a "slam test". A slam test time period of approximately 1.1 seconds is one of the predetermined test parameters. The slam test is performed subsequent to the snapshot pressure value measurement after a time delay equal to the slam test time. Thus, the slam test is performed immediately after the slam test time has expired. This time period is approximately 1.1 seconds and starts when the snapshot pressure value measurement is performed. Immediately after expiration of the slam test time the most recent measured current pressure is compared to the low good slam threshold pressure. If the current measured pressure is above the low good slam threshold pressure, a good part will be indicated and depressurization of the part will occur. On the other hand, if the measured pressure has decayed below the low good slam threshold pressure, then the good part indicator will not be activated and the system will proceed with the next level of testing procedure. This test against the low good standard threshold pressure will last throughout the total test time period and yield a good part result if the measured pressure never reads below the low good standard threshold pressure value. If the measured pressure does go below this test value, then this test will terminate immediately and render a bad part result. Once a good or bad part has been indicated the part will be depressurized.

Once the total test time period has elapsed a second test number with differently set parameters can be applied to the same part while it is still plugged or sealed and attached to the fill line and pressure sensing means. This is achieved by testing as to whether another program or set of program parameters was loaded initially. If there is an additional set of program parameters they are loaded and the process is restarted. On the other hand, if the next program number is set to zero indicating that there is no further programs of test parameters loaded, then the main program test parameters will be allowed to remain in place or will be reloaded with the original test parameter values and the system can be started after a new part is connected to the test apparatus. Of course, if a second program is loaded, the same part can be re-tested without requiring attaching of the test apparatus thereto which is the convenience aspect of the present invention whereby more than one set of program parameters can be loaded. This allows immediate testing of a part without requiring re-attachment to the testing apparatus by two consecutive test programs conducted under separate test parameters.

It is an object of the present invention to provide a method for testing parts for leaks wherein a good or bad test part can be indicated very quickly.

It is an object of the present invention to provide a method for testing parts for leaks wherein a good or bad test part can be indicated usually within maximum of total test time of 15 seconds.

It is an object of the present invention to provide a method for testing parts for leaks wherein a good part can be indicated in a time period of less than 2 seconds if the part stays above a low good slam threshold pressure within a slam test time of approximately less than 2 seconds.

It is an object of the present invention to provide a method for testing parts for leaks wherein a test part can be filled with pressurized gas such as air to an inexact value which is then instantaneously subject to a snapshot pressure measurement which is used to determine two test thresholds of approximately 0.001 psi up to approximately 0.035 psi, but these thresholds can vary widely.

It is an object of the present invention to provide a method for testing parts for leaks wherein very small leakages can be determined within very small time periods.

It is an object of the present invention to provide a method for testing parts for leaks wherein a good part time test can be performed within 2 seconds after the exploration of the pressure stabilization or settle time which is useful in a majority of cases to indicate a good part thereby greatly increasing the number of parts capable of being tested per hour.

It is an object of the present invention to provide a method for testing parts for leaks wherein multiple steps of test parameters can be utilized sequentially with the same testing method without requiring reloading of the part as long as the part has been indicated as a good part by the parameters of the initial test program.

It is an object of the present invention to provide a method for testing parts for leaks wherein the initial pressurization of the part is closely monitored and has the capability of indicating various error conditions.

It is an object of the present invention to provide a method for testing parts for leaks wherein the initial stabilization of a part is limited by the maximum fill time in order to indicate a gross leakage situation.

It is an object of the present invention to provide a method for testing parts for leaks wherein the initial pressurization of the part is monitored for reaching the test pressure prior to the expiration of the minimum fill time which indicates blockage internally within the part.

It is an object of the present invention to provide a method for testing parts for leaks wherein an error message will be generated if the currently measured pressure during pressurization reaches a value more than 25% above the test pressure which indicates a malfunctioning pressure regulation device in the test apparatus.

It is an object of the present invention to provide a method for testing parts for leaks wherein accurate pressurization to a specific pressure by operation of a fill valve is not required initially thus avoiding dependence upon the crude pressure measuring regulating characteristics of most pressure regulators.

It is an object of the present invention to provide a method for testing parts for leaks wherein the testing pressure can be greater than or less than standard normal atmospheric pressure.

It is an object of the present invention to provide a method for testing parts for leaks wherein the part being tested can be filled with any type of fluid material including various liquids or gases.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a method for leak testing of various parts which assures proper initial pressure filling of the sealed environments defined therewithin with a gas such as air. This method has the added capability of a high speed testing process which is highly sensitive to detecting very small pressure losses. Such processes are commonly utilized for testing automotive brake and fuel lines as well as gas and other tanks and gas filler lines and any other lines or, conduits commonly made of wrought or cast metallic or elastomeric materials. This type of decay or leak testing is also commonly used on air conditioner lines, gas masks and any other items, commonly made from metallic or elastomeric materials or both, which define an internal chamber which must be sealing for proper use. It is common to test such products after manufacture and prior to sale by pressurizing the internal chamber with a fluid material and monitoring for any leakage therefrom. The choice of fluid for filling can be any liquid or gas determined to be particularly applicable to the test situation. However, usually a gas such as air will be utilized.

Figure 1:
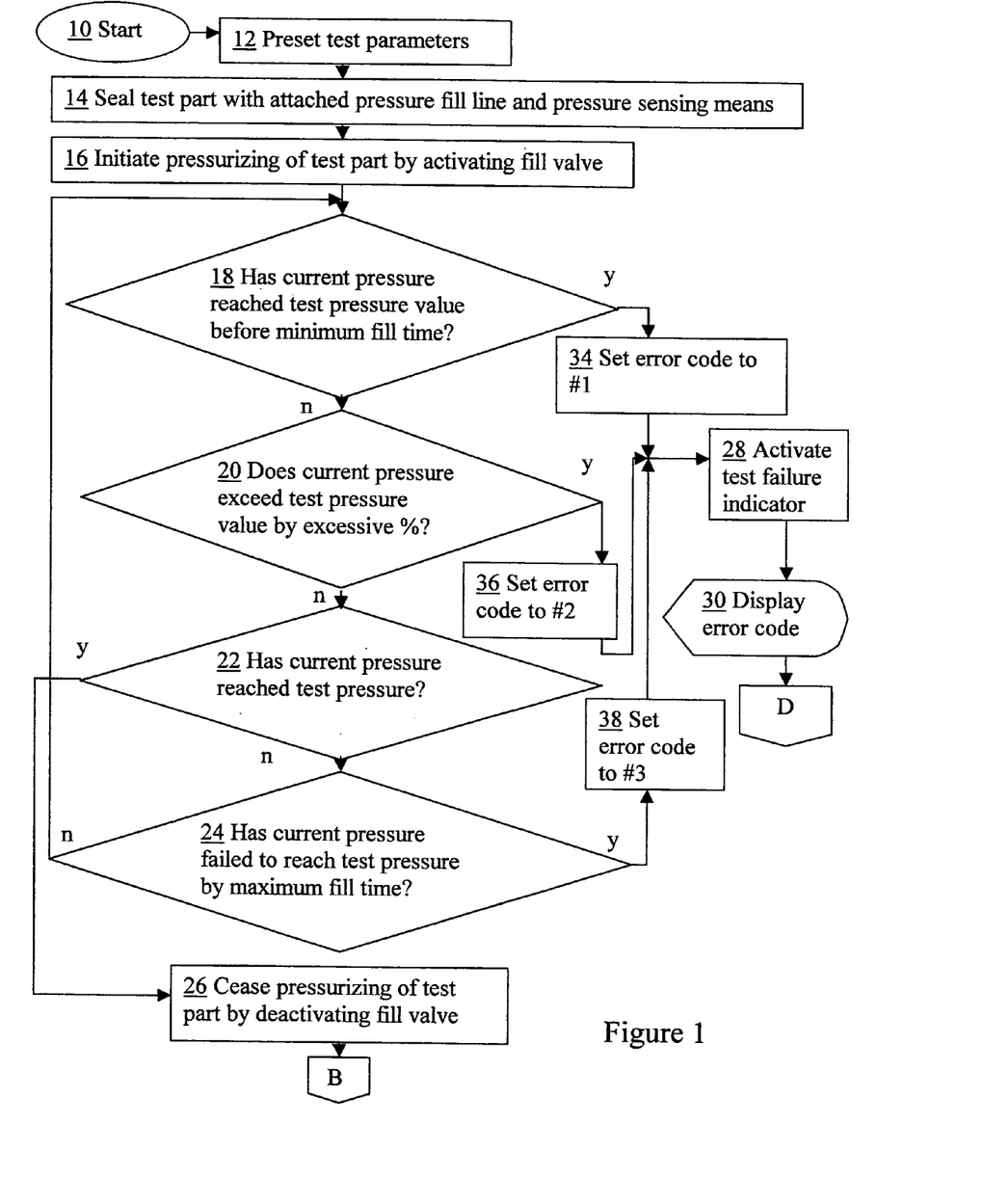
FIG. 1 depicts a flow chart illustrating an embodiment of a portion of the steps of the method of the present invention for initializing the process and pressurizing the part to be tested.

As shown in FIG. 1, when the system is started at step 10, a plurality of test parameters are pre-set immediately thereafter at step 12 and designated with a parameter test set number. These test parameters can be any chosen values however commonly utilized values are listed on the table shown in FIG. 5. In this embodiment, those test parameters include the test pressure value which is the standard target pressure for achieving a full initial pressurization of a part and normally is in the range of approximately 90 pounds per square inch. The total test time is usually defined to be approximately 15 seconds. The standard pressure differential usually has an estimated value of about 0.035 psi, but can vary from 0.0001 to 25.0 psi, and is defined as the loss of pressure within the total test time which will be necessary to indicate a standard part failure. The snapshot time delay is normally chosen to be approximately 4 seconds and is defined as the settle time or delay time after the initial pressurizing of the test part has terminated to allow temperature and pressure equalization. The delay time period must expire prior to further steps of the testing process such as measuring for pressure or for part leakage. The maximum fill time or low air time is defined as the maximum time period within which a part is given to be pressurized to the total pressure value. The inability to reach the predesignated test pressure value within the maximum fill time will normally indicate a grossly leaking part.

Figure 5:
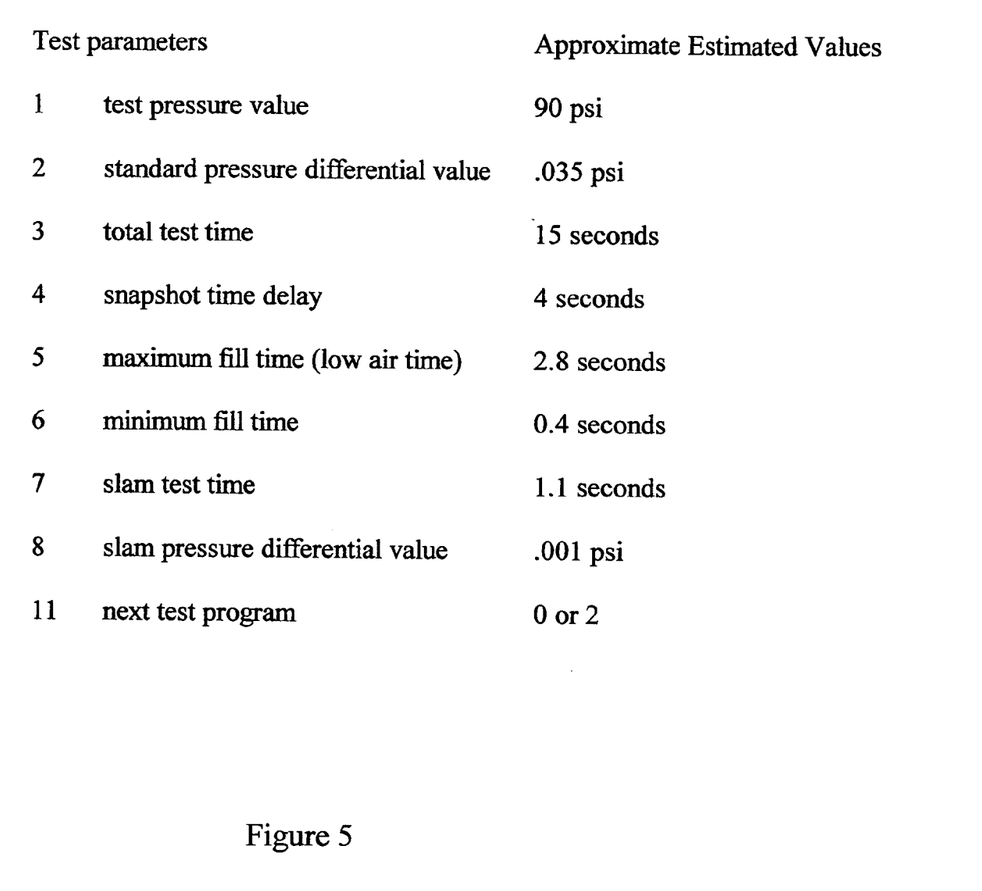
FIG. 5 is a table showing an example of test parameters usable with the method of the present invention with approximate values for each.

Another preset parameter is the minimum fill time. If the test pressure value is reached prior to expiration of the minimum fill time, which is estimated here to be 0.4 seconds, then normally there is a blockage of some type within the part which prevents initial pressurization of the entire interior expanse of the part and thus the pressurization test is labeled as a failure. The slam test time estimated to be 1.1 seconds and is defined as the time delay after taking the snapshot measurement of instantaneous current pressure within which the measured current pressure needs to remain above the low good slam threshold pressure to render a test result of "good part". The slam pressure differential is estimated to be about 0.001 psi and is the pressure drop value above which the measured pressure needs to be maintained during the slam test time in order to render an indication of a good part. The present invention also has the capability of including more than one sets of program parameters such that after one test is concluded, if the part is deemed to be good, than a second test with different parameters can be automatically initiated without requiring reconnecting of the part to the test apparatus.

The method of the present invention can be achieved with various different types of equipment, however an electronic controller is deemed most applicable. With such and electronic controller, system parameters can be pre-set at step 12 in order to predetermine the various parameters for use with a particular test or set of tests. Initially the part to be tested is sealed in such a manner that a pressure fill line is in fluid flow communication with the interior of the part and a pressure sensing means can monitor the pressure level within the sealed environment within the part as shown at step 14. For example, with a brake line or refrigeration line both ends can be plugged and a pressure sensor can be positioned in either plug at either end of the line and a fill pressure line can communicate through one of the plugs to the interior of the pressurized part. After the part is sealed at step 14 initial pressurization occurs at step 16. This step 16 is normally achieved by the activating of a fill valve which initiates pressurization of the chamber to pressure regulator level within the part to be leak tested.

The pressurization will require some time period to reach to the test pressure value. This time period will vary depending upon the various factors including the volume of the portion of the part being leak tested. At step 18 the current pressure is monitored to determine whether it has reached the test pressure value prior to the minimum fill time. If the minimum fill time has not elapsed but the current measured pressure has already reached the test pressure value then an error has occurred which most likely is a result of some type of blockage within the chamber in the part being pressurized. The minimum fill time should be set such that any full pressurization to the test pressure value prior to the expiration of the minimum fill time will indicate a specific error. If decision step 18 yields a positive result, the process will move to step 34 wherein the error code will be set to 1 and a test failure indicator will be activated at step 28. At step 30 the error code will be displayed and the test will proceed to depressurization at step 80 in FIG. 4. On the other hand if the current pressure at step 18 does not reach the test pressure value prior to expiration of the minimum fill time, then the process will move downwardly to step 20.

Steps 18, 20, 22 and 24 comprise the decision blocks or test blocks which when taken together provide assurance that a proper and complete pressurization fill of the part being leak tested has occurred.

Decision step 20 monitors whether the current pressure exceeds the test pressure value at any time by a value of approximately 25%. This is a safety system which monitors whether the test apparatus pressure control means is properly working. If, at any time, the current pressure being sensed exceeds the test pressure value by 25%, or any other value prechosen by the manufacturer or the field service technician, for this dangerous overpressure flag, then a "yes" result will be generated by decision block 20 causing the error code #2 to be set at step 36. Thereafter the test failure indicator will be activated at step 28 and error code #2 will be displayed at step 30 followed by depressurization at step 80 in FIG. 4. This specific failure would normally result from an inaccurate pressure control regulator in the testing apparatus and is a failsafe mechanism to prevent such.

If the current pressure does not exceed the test pressure value when tested at decision step 20, the process will move to test step 22 wherein the current pressure is compared to the test pressure value. If the current pressure has reached the test pressure without error messages being rendered by decision steps 18, 20 or 24, then proper pressurization of the test part has been achieved and the fill valve can be de-activated at step 26. If, however, the current pressure has not yet been reached at step 22, the process will travel to decision step 24 wherein a determination is made as to whether the maximum fill time, also called the low air time, has expired. If the maximum fill time has expired and the measured pressure has still not reached the test pressure value, then an error condition has been reached. If error is determined by a positive result as decision step 24, then it has been determined that usually a massive or gross leak exists in the part and the process will then move to step 38 to set the error code #3 followed by activation of the test failure indicator at step 28 and the display of error code #3 at step 30 followed by depressurization at step 80 in FIG. 4.

Error code #3 will also be indicated under certain conditions other than a gross leak. If a part with two open end is being tested, then it is necessary to plug both ends for leak testing. If the testing plugs are configured such that the sensing means is mounted in one of the end plugs and the fill line is mounted in the other end plug and if there is an internal blockage within the part, then the sensing means will not be in fluid flow communication with respect to the internal test part area wherein the pressure is controlled by the flow through the fill line. In this unique situation, error condition #3 will be displayed because the sensing means will not be able to sense the portion of the test part chamber which is being controlled by the fill line and therefore the current pressure will always fail to reach test pressure by the termination of the maximum fill time. Error code #3 will be an indication of this type of filling error also as well as the more common error tested for by test step 24 where a gross leak problem exists.

Thus, in summary, we see that steps 18, 20, 22 and 24 are the basic decision test steps for making the determination that a proper pressurization or proper fill has occurred of the part. Step 22 can yield a "yes" answer to this question whereas steps 18, 20 and 24 can indicate that a test failure has occurred. In particular, test 18 indicates there is an internal blockage within the chamber in the part if a yes result is generated. A yes result generated on step 20 indicates that the test regulation portion of the test apparatus is not operating properly and test 24 indicates that a leak exists which is so large that proper pressurization to the test pressure value cannot be achieved.

Figure 2:
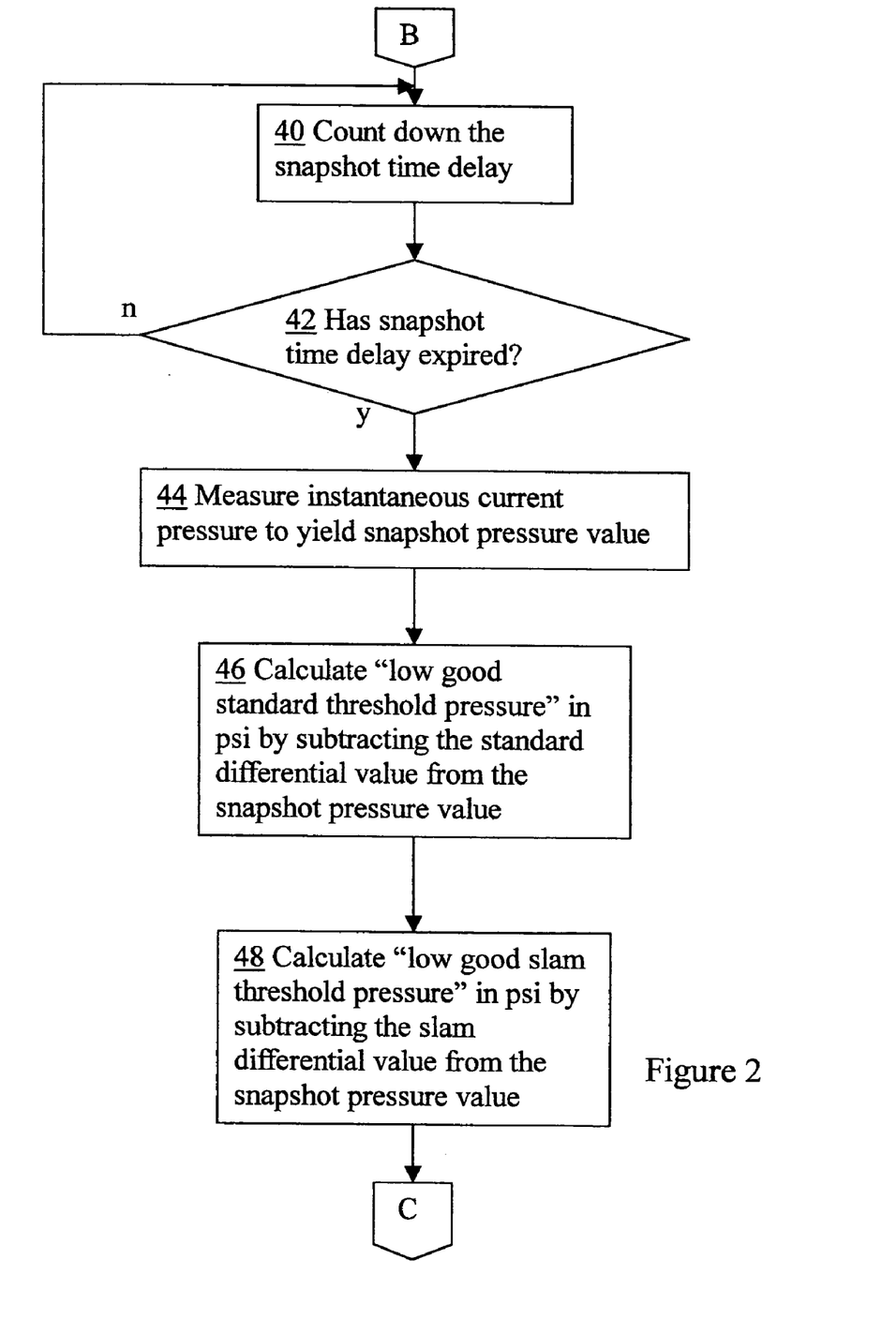
FIG. 2 depicts a flow chart illustrating an embodiment of a portion of the steps of the method of the present invention showing taking of the snapshot pressure measurement after the prior settling time and the calculations of the low good standard threshold pressure and the low good slam threshold pressure.

Once proper pressurization of the test part has been achieved at step 26, the snapshot time delay will start to count down. This time delay is normally approximately 4 seconds. This time delay is called settle time and is for the purpose of allowing complete stabilization of all pressures and temperatures within the part being tested and within the testing apparatus. The process will thus cycle through steps 40 and 42 until the snapshot time delay of 4 seconds or other pre-selected time for this value has expired after which time the process will proceed to step 44.

At step 44 the current pressure will be instantaneously measured to determine the snapshot pressure value. This snapshot pressure value will be used at steps 46 and 48 for further calculations. In particular, at step 46 the low good standard threshold pressure will be calculated in psi by subtracting the basic or standard differential value from the snapshot pressure value. In step 48 the low good slam threshold pressure will be calculated in psi by subtracting the slam differential value from the snapshot pressure value measurement. Both of these calculations in steps 46 and 48 will be calculated based on the snapshot pressure value measurement taken in step 44 and will not change during further testing of the current part despite subsequent changes in measured pressure.

Figure 3:
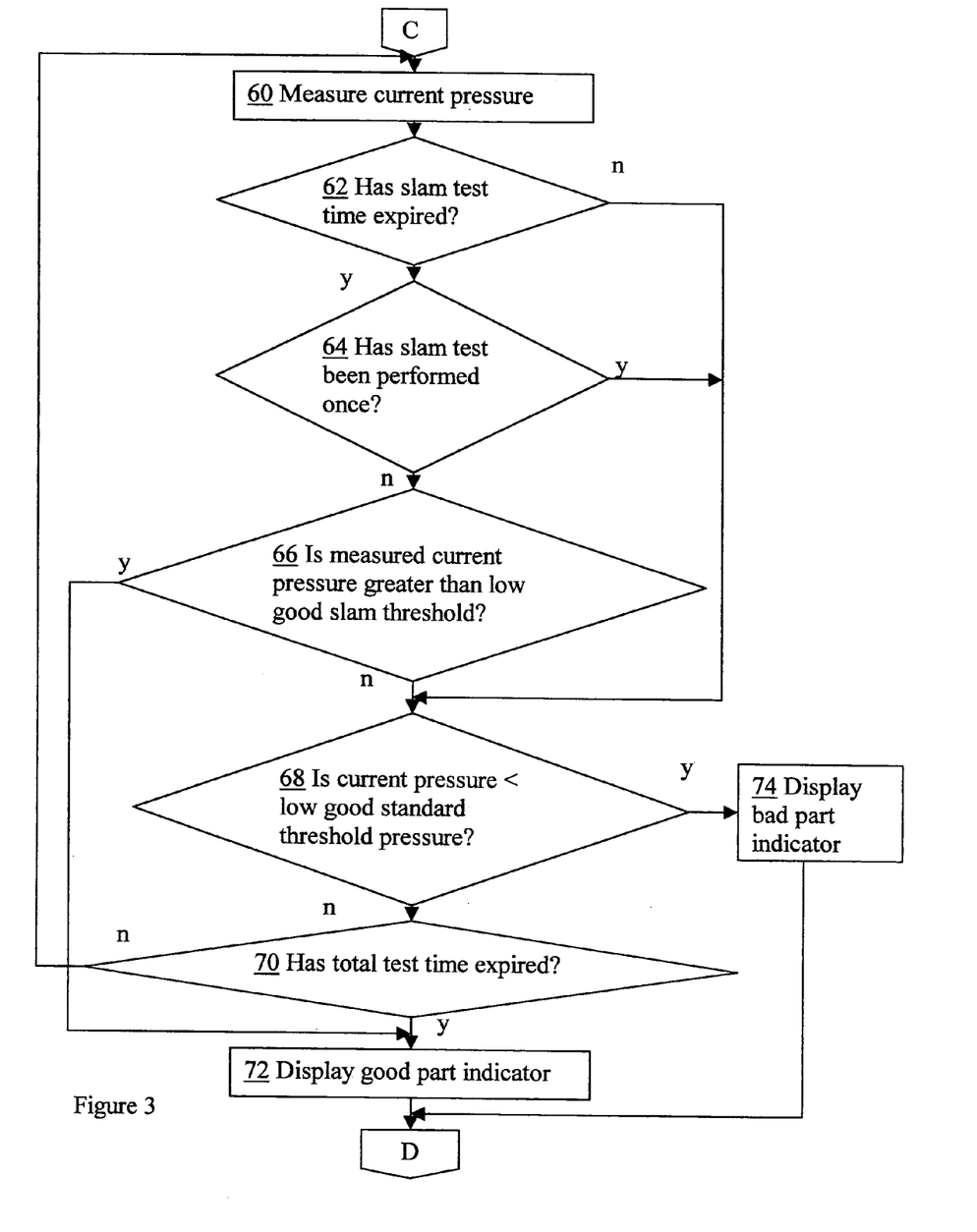
FIG. 3 depicts a flow chart illustrating an embodiment of a portion of the steps of the method of the present invention showing the slam threshold pressure testing sequence and the standard threshold pressure testing sequence.

Once these two values are determined the process proceeds to the measurement of current pressure at step 60 in FIG. 3. Thereafter the method proceeds to step 62 where a determination is made as to whether the slam test time has expired. The slam test time is a basic test parameter and normally has a value of approximately 1.1 seconds. The slam test time is the time delay period after determining of the snapshot pressure value, after which the slam test is actually performed. The slam test itself is performed at step 66. However, step 64 determines whether the slam test has already been performed or not on this part, because it will be performed only once during each test and must be conducted immediately after termination of the slam test time period. At step 66 the slam test is performed in order to make the determination whether the measured current pressure is greater than the low good slam threshold value which was calculated in step 48. This test performed at decision step 66 is only performed once and will not be performed until the slam test time has expired. Thus, at step 66, if the slam test time has not expired the process will skip below to step 68. At step 68 the current pressure measured at step 60 will be compared to the low good standard threshold pressure which was determined at step 46. If the current pressure is less than the low good standard threshold pressure, then the process will proceed to step 74 and a bad part indicator will be displayed followed by depressurization of the test part at step 80. If, however, the measured current pressure is not less than the low good standard threshold pressure at step 68 the process will move to decision step 70 where a test will perform as to whether the test time period has expired. Normally the total test time is chosen to be approximately 15 seconds. If the test time has not expired then the process will loop back to step 60 where a new current pressure measurement will be taken.

The process will then proceed to step 62 where a test will be performed as to whether the slam test time has expired. If the slam test time is indicated as being expired by test 62 the process will proceed to 64 wherein a test will be made as to whether the slam test itself has already been performed. If it has already been performed the process will proceed to step 68. However, if it has not yet been performed, the process will proceed to step 66. At step 66 the slam test itself is performed. Step 66 makes the determination whether the measured current pressure is greater than the low good slam threshold. This test at 66 will only be performed once and only be performed after the slam test time has expired. Once the slam test time expires and decision step 62 allows the process to move downwardly and once the slam test time has already been performed as tested for by decision block 64, the process will skip the slam test decision step 66 and proceed directly to the standard test decision at step 68. Thus, decision block 66 has one initial chance to cut the test short by rendering an immediately decision that the part is good and thereafter proceeding to good part display step 72. If this test 66 does not indicate a positive result the test will never be performed again. The advantage here is that the test 66 can provide an determination of a good part at a very early point in the test. If the slam test at 66 yields a negative result, then no further slam tests at step 66 will be performed on this part during the entire remaining portion of the test. Each time the process sequence reaches step 64, a "yes" result will result and will proceed to step 68 for the standard test and the slam test at step 66 will be skipped for the duration of the current test. Thereafter the only test which can yield a good part will be the combination of test 68 yielding a negative result and test 70 indicating that the total time has indeed expired. On the other hand, if test 70 yields a negative result and thereafter test 68 yields a positive result then the process will proceed to step 74 and a bad part will be indicated.

As such, the present invention provides two discreet levels of testing. The slam test performed in decision block 66 is performed only once approximately 1.1 seconds after the snapshot measurement at step 44. If the current pressure in the part is above the low good slam threshold, a good part will be indicated and the process will terminate early by proceeding from decision block 66 directly to the displaying of the good part indicator at step 72. On the other hand, if the measured current pressure is not greater than the low good slam threshold at box 66 during the one time that this slam test is performed, the process will proceed to step 68 which in combination with step 70 will provide the low good standard threshold testing over the total test time period of approximately 15 seconds. This test period will only terminate if decision step 68 yields a positive result. As long as the current pressure measured at step 60 does not measured less than the low good standard threshold pressure at step 68 the test will continue to the end of the total test time. Once the total test time expires without the test at step 68 yielding a positive result, the decision block 70 will then yield a positive result causing the display of the good part indicator at step 72 and depressurization for ending the test. Thus, the method of the present invention provides a unique two level testing process. This two level process can yield a good part on a significantly expedited time schedule based upon comparing the measured current pressure with the low good slam threshold while at the same time providing another pressure test based upon the low good standard threshold pressure below which the measured pressure should not move within the 15 second total test time in order to yield a good part.

It should be appreciated that the test 66 cannot yield a bad part result. It can only yield a good part result. If the measured current pressure 60 does drop below the low good slam threshold at the expiration of the slam test time, then the method will proceed from step 66 to 68 for testing against the low good standard threshold. As such, the slam test performed at test 66 will indicate a good part or will indicate that further testing must be made against the low good standard threshold pressure at step 68 during the total test time. This two step testing process provides a very rapid means for indicating the vast majority of the parts as being good within a very narrow time period such as a slam test time period of as little as 1.1 seconds after snapshot measurement taken at step 44. The depressurization which occurs in FIG. 4 at step 80 occurs in all tests. This is the target step after the displaying of the good part indicator at step 72 of FIG. 3 or the displaying of a bad part indicator at step 74 of FIG. 3 and it is also the target step from a test failure indicator at step 28 through the error code displayed at step 30. Once the test part is depressurized, re-initiation of the system is required. Step 82 will determine whether a bad test result has occurred. If a bad test result has indeed occurred and a positive result is yielded at decision block 82, the program 1 test parameters will be reloaded at step 88 and the system will proceed to re-start. This step is required in order to terminate any further testing based on further parameters with respect to a part that has already failed on the first test.

Figure 4:
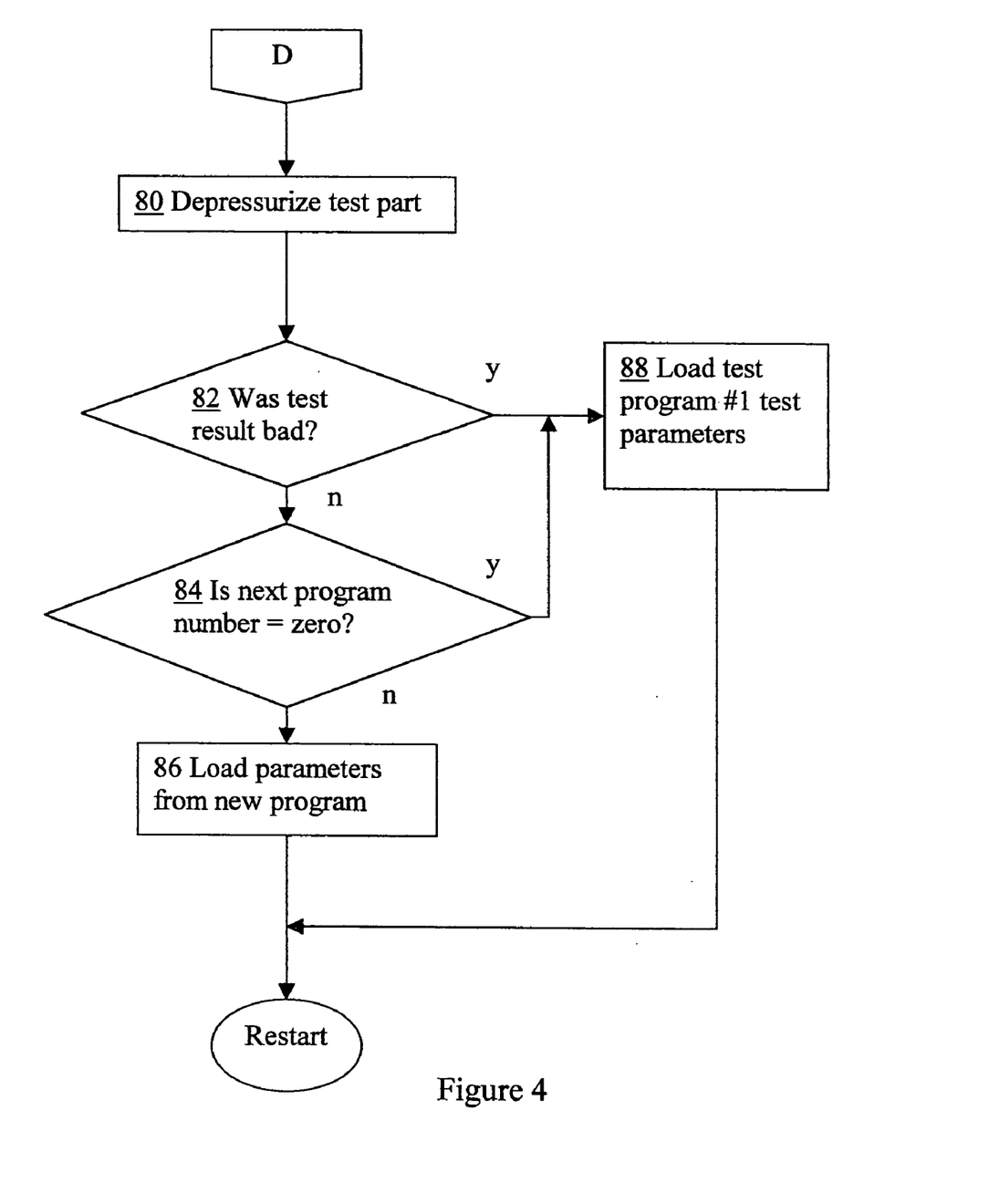
FIG. 4 depicts a flow chart illustrating an embodiment of a portion of the steps of the methods of the present invention which includes the restarting step sequence.

On the other hand, if the determination is made that the test result is not bad at step 82, the process will then move to step 84 to determine whether there is a new grouping of program parameters to be entered. At step 84 a determination is made as to whether the next program is set to zero. If it is set to zero then this means that there is no further programs and the process will proceed to step 88 wherein the original test program parameters from program 1 will be re-entered and the process will be ready to restart for testing a new part. On the other hand if the next program is not set to zero the new program test parameters will be loaded at step 86 after which time the system will re-start and the testing of the same part will occur based upon the new parameters of the new test program number. In this manner a means is provided for halting the loading of a new program for a part that has already failed and for allowing the loading of the parameters of the new program for a part that has yielded a good result during the first test and now needs to be tested again for some other reason in accordance with a second set of parameters.

While particular embodiments of this invention have been shown in the figures and described above, it will be apparent, that many changes may be made in the form, arrangement and positioning of the various elements of the methods and processes. In consideration thereof it should be understood that preferred embodiments of this invention disclosed herein are intended to be illustrative only and not intended to limit the broadness and scope of the invention.

We claim:

1. A method for leak testing of a part comprising:
 A. presetting of a plurality of test parameters including:
  (1) test pressure value;
  (2) standard pressure differential value;
  (3) total test time;
  (4) snapshot time delay;
  (5) slam test time;
  (6) slam pressure differential value;
 B. sealing of the test part with a fill line and a pressure sensing means attached thereto in fluid flow communication with respect to the sealed environment therewithin;
 C. pressurizing of the test part by supplying fluid through the fill line into the part being tested while monitoring thereof;
 D. ceasing pressurization of the test part;
 E. pausing for a period of time of a duration equal to the snapshot time delay;
 F. determining the snapshot pressure value by measuring the instantaneous current pressure within the pressurized part;
 G. calculating the low good standard threshold pressure by subtracting the standard differential value from the snapshot pressure value;
 H. calculating the low good slam threshold pressure by subtracting the slam differential value from the snapshot pressure value;
 I. measuring of the current pressure instantaneously within the part being tested;
 J. delay for a period of time equal to the slam test time after determining the snapshot pressure value;
 K. performing slam test by determining whether the measured current pressure is greater than the low good slam threshold pressure value, and, if yes, then proceeding to display the good part indicator and proceeding to depressurizing;
 L. performing standard test by determining whether the measured current pressure is less than the low good standard threshold pressure, and, if yes, displaying bad part indicator and proceeding to depressurizing;
 M. further performing of the standard test repeatedly until expiration of the total test time and then, if all standard tests result in a no result, proceeding to display a good part indicator and depressurizing; and
 N. depressurizing the test part.

2. A method for leak testing of a part as defined in claim 1 wherein said presetting of a plurality of test parameters further includes the following two test parameters:
 A. maximum fill time; and
 B. minimum fill time.

3. A method for leak testing of a part as defined in claim 2 wherein said pressurizing of the test part by supplying fluid through the fill line into the part being tested while monitoring thereof comprises:
 A. initiating pressurizing of the part by starting the flow of fluid through fill line into the test part;
 B. determining whether the current pressure monitored has reached the test pressure value prior to expiration of the minimum fill time, and if yes, set and display a first error code and activate a test failure indicator and proceed to depressurizing the test part;
 C. determining whether the current pressure monitored exceeds the test pressure value by a predetermined excess percentage level thereof, and if yes, set and display a second error code and activate a test failure indicator and proceed to depressurizing the test part;
 D. determining whether the current pressure has reached the test pressure value, and if yes, proceed to ceasing pressurization of the test part; and
 E. determining whether the maximum fill time has expired since initiating pressurizing of the part the current pressure has failed to reach the test pressure value, and, if yes, set and display a third error code and activate a test failure indicator and proceed to depressurizing the test part, and if no, return to said determining whether the current pressure monitored has reached the test pressure value prior to expiration of the minimum fill time.

4. A method for leak testing of a part as defined in claim 3 wherein the first error code indicates that a blockage exists within the test part that prevents pressurization of the entire test part.

5. A method for leak testing of a part as defined in claim 3 wherein the second error code indicates that the test control apparatus is malfunctioning by allowing the current pressure to exceed the test pressure by a dangerously high percentage.

6. A method for leak testing of a part as defined in claim 3 wherein said determining whether the current pressure monitored exceeds the test pressure value by a predetermined excess percentage level is performed utilizing a predetermined excess pressure percentage level of 25% greater than the test pressure value.

7. A method for leak testing of a part as defined in claim 3 wherein the third error code indicates that a leak exists in the test part that prevents achieving of pressurization thereof to the test pressure value.

8. A method for leak testing of a part as defined in claim 3 wherein the third error code indicates that a blockage exists within the test part that prevents achieving of pressurization thereof to the test pressure value in an area in fluid flow communication with respect to the pressure sensing means.

9. A method for leak testing of a part as defined in claim 1 wherein said presetting of the test pressure value is performed to a value between zero and 200 pounds per square inch.

10. A method for leak testing of a part as defined in claim 1 wherein said presetting of the test pressure value is performed to a value of approximately 90 pounds per square inch.

11. A method for leak testing of a part as defined in claim 1 wherein said presetting of the standard pressure differential value is performed to a value between 0.015 and 0.050 pounds per square inch.

12. A method for leak testing of a part as defined in claim 1 wherein said presetting of the standard pressure differential value is performed to a value of approximately 0.035 pounds per square inch.

13. A method for leak testing of a part as defined in claim 1 wherein said presetting of the total test time is performed to a value of between 5 and 25 seconds.

14. A method for leak testing of a part as defined in claim 1 wherein said presetting of the total test time is performed to a value of approximately 15 seconds.

15. A method for leak testing of a part as defined in claim 1 wherein said presetting of the snapshot time delay is performed to a value between 2 and 6 seconds.

16. A method for leak testing of a part as defined in claim 1 wherein said presetting of the snapshot time delay is performed to a value of approximately 4 seconds.

17. A method for leak testing of a part as defined in claim 1 wherein said presetting of the slam test time is performed to a value between 0.5 and 2.0 seconds.

18. A method for leak testing of a part as defined in claim 1 wherein said presetting of the slam test time is performed to a value of approximately 1.1 seconds.

19. A method for leak testing of a part as defined in claim 1 wherein said presetting of the slam pressure differential value is performed to a value between 0.0001 and 0.0100 pounds per square inch.

20. A method for leak testing of a part as defined in claim 1 wherein said presetting of the slam pressure differential value is performed to a value of approximately 0.001 pounds per square inch.

21. A method for leak testing of a part as defined in claim 1 wherein said presetting is performed with the value of the slam pressure differential being set to a value less than the value of the standard pressure differential value.

22. A method for leak testing of a part as defined in claim 2 wherein said presetting of the maximum fill time is performed to a value between 1.5 and 4.0 seconds.

23. A method for leak testing of a part as defined in claim 2 wherein said presetting of the maximum fill time is performed to a value of approximately 2.8 seconds.

24. A method for leak testing of a part as defined in claim 2 wherein said presetting of the minimum fill time is performed to a value between 0.1 and 1.0 seconds.

25. A method for leak testing of a part as defined in claim 2 wherein said presetting of the minimum fill time is performed to a value of approximately 0.4 seconds.

26. A method for leak testing of a part as defined in claim 1 wherein said sealing of the test part includes positioning of at least one plugging fixture in engagement with the part to facilitate defining of an interior chamber therewithin for pressurization testing thereof.

27. A method for leak testing of a part as defined in claim 26 wherein the fill line and the pressure sensing means are mounted to one of the plugging fixtures to facilitate fluid flow communication thereof with respect to the interior chamber defined within the part to be tested.

28. A method for leak testing of a part as defined in claim 1 wherein said pressurizing of the test part by supplying fluid through the pressure fill line into the part is performed by supplying gas through the fill line into the test part for leak testing thereof.

29. A method for leak testing of a part as defined in claim 1 wherein said pressurizing of the test part by supplying fluid through the pressure fill line into the part is performed by supplying air through the fill line into the test part for leak testing thereof.

30. A method for leak testing of a part as defined in claim 1 wherein said determining the snapshot pressure value is performed once to determine a snapshot pressure value which remains fixed for the duration of the current test.

31. A method for leak testing of a part as defined in claim 1 wherein said presetting of a plurality of test parameters further includes presetting of a next program number.

32. A method for leak testing of a part as defined in claim 31 further comprising:
 A. after depressurizing of the test part, determining whether a bad part result has been indicated and, if yes, then retain the first test parameters from said presetting of a plurality of test parameters and restart the leak testing method for a new part; and
 B. monitor the next program number and, if equal to zero, then retain the first test parameters from said presetting of a plurality of test parameters and restart the leak testing method for a new part, and, if equal to a number greater than 0, then loading of those preset test parameters associated with the new test number for restarting the testing method for the previously tested part using the newly loaded test program parameters.

33. A method for leak testing of a part as defined in claim 1 wherein said performing slam test is performed only once during each part testing sequence of steps and wherein said performing standard test is performed at least once during each part testing sequence of steps.

34. A method for leak testing of a part as defined in claim 1 wherein said presetting of a plurality of test parameters includes setting of the test pressure value to a value less than atmospheric pressure.

35. A method for leak testing of a part as defined in claim 1 wherein said presetting of a plurality of test parameters includes setting of the test pressure value to a value greater than atmospheric pressure.

36. A method for leak testing of a part comprising:
A. presetting of a plurality of test parameters including:
   (1) test pressure value;
   (2) standard pressure differential value;
   (3) total test time;
   (4) snapshot time delay;
   (5) slam test time;
   (6) slam pressure differential value;
   (7) maximum fill time;
   (8) minimum fill time;
   (9) next test program;
B. sealing of the test part with a fill line and a pressure sensing means attached thereto in fluid flow communication with respect to the sealed environment therewithin;
C. initiating pressurizing of the part by starting the flow of fluid through fill line into the test part;
D. determining whether the current pressure monitored has reached the test pressure value prior to expiration of the minimum fill time, and if yes, set and display a first error code and activate a test failure indicator and proceed to depressurizing the test part;
E. determining whether the current pressure monitored exceeds the test pressure value by a predetermined excess percentage level thereof equal to 25 percent, and if yes, set and display a second error code and activate a test failure indicator and proceed to depressurizing the test part;
F. determining whether the current pressure has reached the test pressure value, and if yes, proceed to ceasing pressurization of the test part;
G. determining whether the maximum fill time has expired since initiating pressurizing of the part the current pressure has failed to reach the test pressure value, and, if yes, set and display a third error code and activate a test failure indicator and proceed to depressurizing the test part, and if no, return to said determining whether the current pressure monitored has reached the test pressure value prior to expiration of the minimum fill time;
H. ceasing pressurization of the test part;
I. pausing for a period of time of a duration equal to the snapshot time delay;
J. determining the snapshot pressure value by measuring the instantaneous current pressure within the pressurized part;
K. calculating the low good standard threshold pressure by subtracting the standard differential value from the snapshot pressure value;
L. calculating the low good slam threshold pressure by subtracting the slam differential value from the snapshot pressure value;
M. measuring of the current pressure instantaneously within the part being tested;
N. delay for a period of time equal to the slam test time after determining the snapshot pressure value;
O. performing slam test once by determining whether the measured current pressure is greater than the low good slam threshold pressure value, and, if yes, then proceeding to display the good part indicator and proceeding to depressurizing;
P. performing standard test by determining whether the measured current pressure is less than the low good standard threshold pressure, and, if yes, displaying bad part indicator and proceeding to depressurizing;
Q. further performing of the standard test repeatedly until expiration of the total test time and then, if all standard tests result in a no result, proceeding to display a good part indicator and depressurizing; and
R. depressurizing the test part.

\* \* \* \* \*